United States Patent

[11] 3,579,845

[72] Inventors Lee Hunter
St. Louis County;
David A. Senften, Florissant, Mo.; Edwin
W. Logan, Belleville, Ill.
[21] Appl. No. 811,160
[22] Filed Mar. 27, 1969
[45] Patented May 25, 1971
[73] Assignee Hunter Engineering Company
Bridge, Mo.

[54] DYNAMIC WHEEL TOE AND TIRE PULL TESTING APPARATUS
7 Claims, 7 Drawing Figs.
[52] U.S. Cl. ................................................ 33/203.13
[51] Int. Cl. ............................................... G01b 19/28
[50] Field of Search .......................................... 33/203,
203.12, 203.13, 203.14; 73/(Inquired)

[56] References Cited
UNITED STATES PATENTS
| | | | |
|---|---|---|---|
| 3,187,440 | 6/1965 | Merrill et al. | 33/203.13 |
| 3,453,740 | 7/1969 | Sakamoto | 33/203.13 |

*Primary Examiner*—William D. Martin, Jr.
*Attorney*—Gravely, Lieder and Woodruff

ABSTRACT: Dynamic testing apparatus for vehicle wheels for determining the wheel toe relationship and for measuring the extent of lateral pull or scuffing developed between the tire tread and the road surface. The apparatus includes adder-memory and subtractor-memory circuits responsive to wheel toe signals generated by a dynamic wheel driving apparatus which rotates the wheels in forward and reverse directions to obtain wheel toe measurements independent of the lateral pull developed by the tire characteristics on the rotating surfaces and to obtain an indication of the tire pull characteristics of the tire.

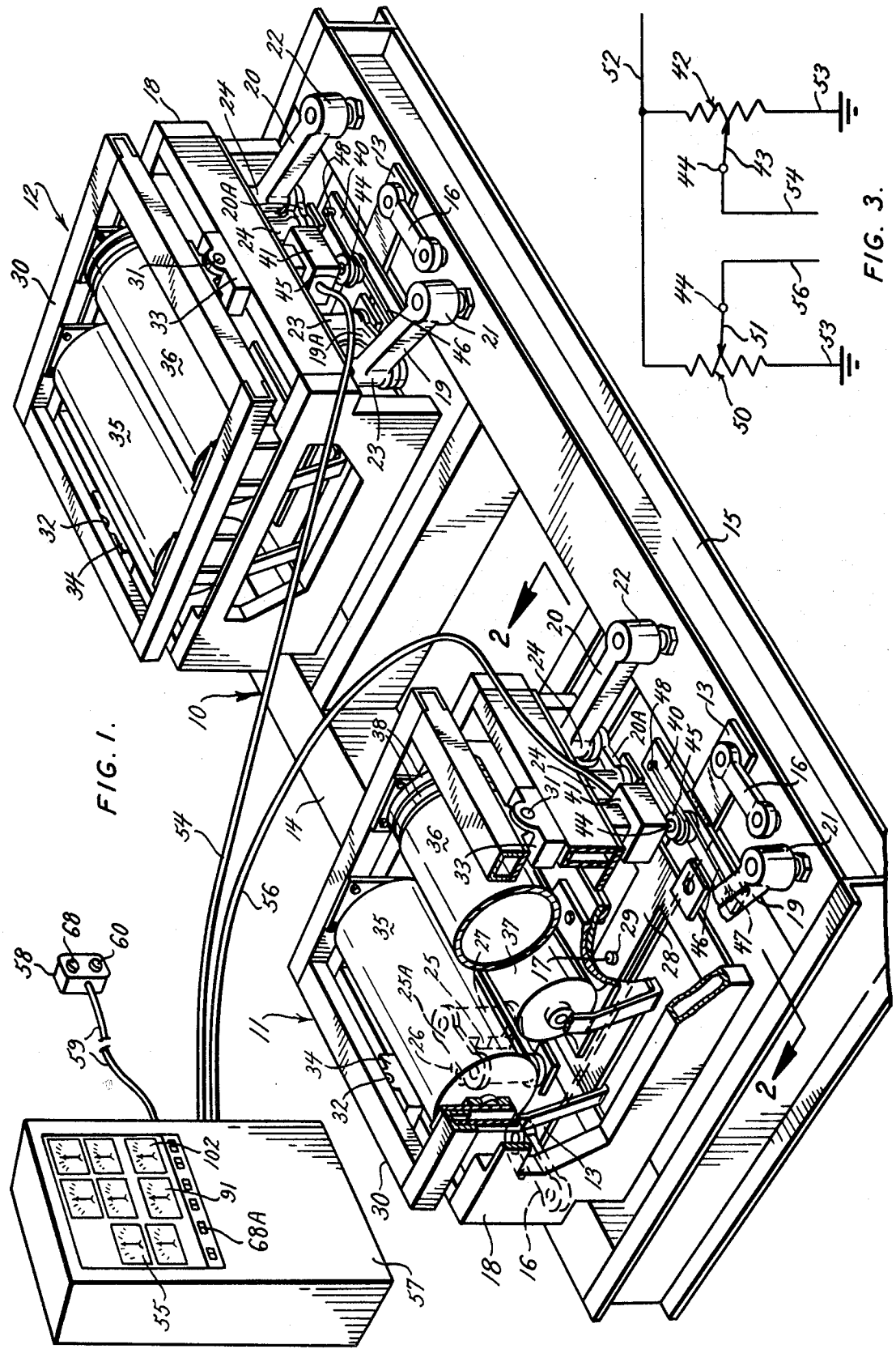

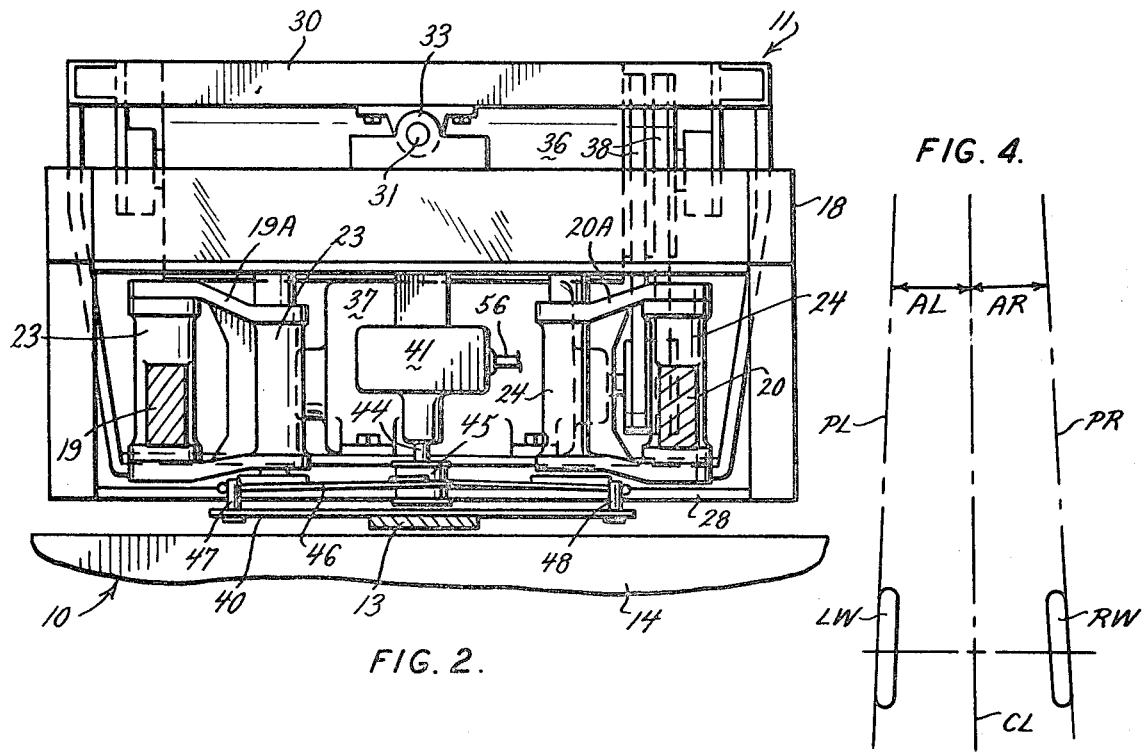

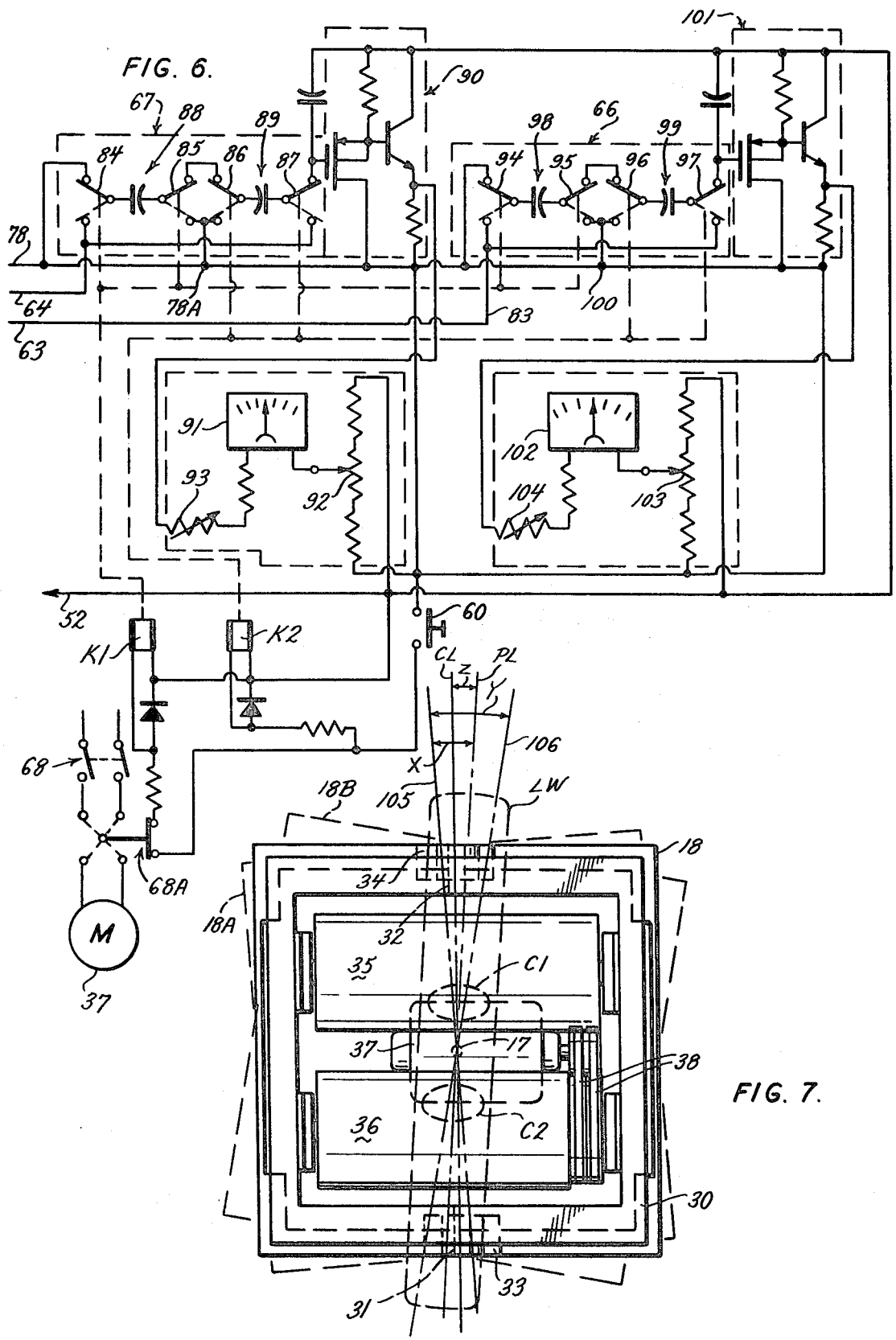

DYNAMIC WHEEL TOE AND TIRE PULL TESTING APPARATUS

This invention relates to testing apparatus used in determining vehicle wheel alignment and tire pull characteristics, and is particularly directed to new and useful dynamic wheel alignment testing apparatus incorporating a method and means for measuring the degree of lateral pull or scuffing of the tire tread on the road surface which is not attributable to the vehicle's geometric wheel alignment.

It has long been recognized that proper vehicle steerable wheel alignment contributes to safety of operation because the vehicle is made stable while running at high speed and directional control is vastly improved. Proper alignment includes caster, camber and toe determination to maintain the manufacturers specification. However, it has become increasingly evident from data obtained during careful wheel alignment adjustments that there is an influence or unusual force working on the vehicle wheels which produces a disturbing condition. This condition is manifested in poor handling characteristics as well as rapid wear of the tires, and its cause cannot be determined with the usual alignment testing apparatus currently available.

The presence of this unusual force working on steerable vehicle wheels has been found by comparing the toe alignment results obtained with static measuring apparatus with the toe alignment results obtained with dynamic measuring apparatus. These two types of apparatus were found to give different toe readings, in some cases for the same vehicle wheels, even though care was exercised in checking the condition of the wheel suspension components to eliminate errors that might be introduced by worn or damaged joints and bearings.

Determination of toe alignment using static measuring apparatus has generally been regarded as more accurate than the dynamic measuring apparatus. However, static measuring apparatus requires so much time to complete alignment measurements that the preference is to use the faster dynamic apparatus for determining wheel toe alignment. It is now believed that the different results reached by static and dynamic alignment measurements of toe is due in great part to the fact that when the wheels are rotated, as in the dynamic apparatus, the action of the tire contact on the roller cradle can introduce a force that changes the toe measurement. The force is generally directed laterally of the direction of wheel rotation. Thus, in dynamically measuring wheel toe alignment any nonuniform structural characteristics of the tire will show up as a false toe angle or scuffing of the tire tread. The scuffing of the tread can be measured in terms of the distance a tire will want to move laterally for a mile of travel in a straight ahead line.

In order to make an accurate determination of the toe relationship and of lateral scuffing due to these nongeometric factors the dynamic measuring apparatus is first operated with the steerable wheels rotated for forward drive. During the first operation a toe reading is recorded in an adder-memory circuit and displayed on appropriate meters. The apparatus is then reversed so the wheels rotate in the reverse direction and a new toe reading is recorded in the adder-memory. By appropriate electrical analyzing means the two readings are added algebraically and scaled so that the meter reading can display the average of the results of forward and reverse rotation.

Simultaneously with the above operation of the apparatus, the individual toe angle (the angle the plane of the wheel makes with the centerline of the vehicle) for forward and reverse rotation of each wheel is recorded in a subtractor-memory circuit. By appropriate electrical analyzing means the two readings are subtracted algebraically and scaled for display on an appropriate meter. The meter reading displays the difference between these two angular relationships and gives the operator an indication of the amount of scuff or lateral pull on the tires not attributable to the geometric toe relationships of the vehicle. When the difference in meter readings is large it indicates that tire tread wear will be rapid and handling difficult.

Therefore, the objects of this invention are to provide means for analyzing and displaying the average of the wheel toe angles in forward and reverse rotation and to electrically read the difference of the individual toe angles and to provide apparatus of the character described that can be operated in a simple and efficient manner, to provide apparatus that does not require skill to operate and to provide electrical means that is accurate and durable for the purposes set forth.

A preferred embodiment of this invention will be described in detail in the following specification of apparatus shown in the accompanying drawings, wherein:

FIG. 1 is a schematic perspective view of apparatus for supporting and rotating steerable vehicle wheels in a manner to respond to the plane of wheel and to transmit suitable electrical signals for activating meters that will visually record the results of the wheel rotation in forward and reverse directions;

FIG. 2 is a fragmentary sectional elevational view taken at line 2-2 in FIG. 1 of the left wheel rotating assembly;

FIG. 3 is an electrical schematic diagram for transforming the mechanical response of the apparatus of FIG. 1 into electrical signals suitable for use in this system;

FIG. 4 is a schematic diagram of the angular relation of the plane of the left and right wheels to the longitudinal centerline of a vehicle;

FIG. 5 is an electrical circuit diagram for converting the wheel toe signals for forward and reverse rotation into an average toe reading;

FIG. 6 is an electric circuit diagram for converting the wheel signals into meter readings indicative of lateral pull or scuffing of the tire treads; and FIG. 7 is a greatly enlarged diagrammatic illustration for the left wheel of the tire pull determination.

Referring to FIG. 1 there is shown schematically apparatus for rotating the left and right steerable wheels (not shown) of a vehicle. The essentials of this apparatus comprise a suitable frame structure 10 having an open central area in which a left wheel rotating assembly 11 and a right wheel rotating assembly 12 is disposed. Both of these assemblies 11 and 12 are substantially alike and similar reference characters will be used to designate similar parts. A description of the right wheel assembly 12 will now be set forth.

A motion control bar 13 is mounted between the front member 14 and rear member 15 of frame 10 to be parallel to the longitudinal axis of the vehicle. This control bar is connected by links 16 at its opposite ends to the members 14 and 15 so that the bar can move longitudinally with only slight lateral movement due to the articulated swing of the links 16. A center pivot pin 17 is carried by the control bar 13.

A carrier cradle 18 is operably mounted on the stationary frame 10 by a pair of articulated arms 19 and 20 which have outer ends pivotally connected at bearings 21 and 22 respectively to the frame member 15. The inner ends of the arms 19 and 20 are suitably pivotally connected by links 19A and 20A respectively to the carrier cradle at bearings 23 and 24 respectively. The opposite end of the carrier cradle 18 is supported by a single articulated arm 25 mounted on the frame member 14 by a bearing 26 at its outer end. The inner end of arm 25 is connected by a link 25A to the carrier cradle by a suitable bearing 27. The carrier cradle 18 has a horizontal bottom plate 28 which is provided with an aperture 29 that fits over the center pin 17 on the control bar.

The manner of operatively mounting the carrier cradle 18 on the frame 10 and the manner of its connection to the control bar 13 limits its range of movement to the horizontal plane of the frame 10. Thus, the cradle 18 is free to swing or move longitudinally and turn angularly to follow the toe-in or toe-out plane of the vehicle wheel supported thereon. Relative angular motion between the carrier cradle 18 and the control bar 13 is therefore possible.

A wheel supporting cradle 30 is disposed within the carrier cradle 18 and is connected by horizontal pivot shafts 31 and 32 to bearings 33 and 34 respectively mounted on the carrier cradle 18. The shafts 31 and 32 are axially aligned and centered with the longitudinal centerline of the control bar 13 so that the vertical axis of the center pin 17 intersects the horizontal axis of the shafts 31 and 32. The wheel supporting cradle 30 operatively supports a pair of wheel engaging rollers 35 and 36 which can shift axially relative to each other, as set forth in the said Merrill patent and for the purposes therein described. One of the rollers, as roller 36, is driven by an electric motor 37 through suitable belt means 38. The other roller is free to rotate in response to rotation of a wheel cradled on both rollers. The cradle 30 is movable about the axis of shafts 31 and 32 in response to the camber angle of the wheel thereon, but for present purposes of disclosure the tipping movement of the cradle 30 is not important except as it affects the angular position of the carrier cradle 18.

Still referring to FIG. 1, the control bar 13 carries crossarm 40, and mounted above the crossarm for the right-hand assembly 12 is a housing 41 in which a motion sensor, such as potentiometer 42 (FIG. 3) is mounted with its brush arm 43 connected to a depending shaft 44 on which a pulley 45 is mounted. A drive cable 46 is wound on the pulley 45 and its opposite ends are anchored at 47 and 48 to the ends of the crossarm 40. The relative angular movement between the carrier cradle 18 and the control bar 13, caused by the forces of a rotating tire, is transmitted by the cable 46 to the arm 43 of the potentiometer so that a signal is produced which is a function of the angular position, (individual toe) of the vehicle wheel. The left-hand assembly 11 of FIG. 1 has a similar motion sensor potentiometer in the housing 41, and it is shown in FIG. 3 at 50 with a brush arm 51 which is moved by a like pulley 45 on a shaft 44 which depends from the housing 41.

The circuit diagram of FIG. 3 shows the potentiometers 42 and 50 for the right and left wheels of a vehicle. The voltage for the potentiometers is supplied from a suitable source 52, and the opposite side of each is grounded at 53. The signal from brush arm 43 is transmitted by line 54 to an adder-memory unit 65 and then through a buffer amplifier to a suitable meter 55 shown in FIG. 4 and the signal from brush arm 51 is transmitted by line 56 to the adder-memory unit 65. These signal transmission lines are connected into the circuit shown in FIG. 5 which will be described in more detail presently.

Referring to the schematic diagram of FIG. 4, it can be seen in the case of wheel toe that the right wheel RW has an angular relation (AR) with the centerline (CL) of a vehicle and the left wheel (LW) has an angular relation (AL) with the same centerline (CL). These angular relations generally have a small value as is represented by the right and left wheel plane lines PR and PL. When, however, the wheels are rotated on the driving apparatus of FIG. 1, the sensors assume that the planes of the wheels are aligned with the plane of the rollers. However, there can be an angular misalignment between the toe relationship of the vehicle and the toe relationship assumed by the measuring apparatus if there are tire pull forces present. This will be described in more detail in FIG. 7. Since the tire pull forces are rotation sensitive, when the wheels are rotated in reverse the driving apparatus assumes a toe relationship with a misalignment just opposite of that encountered with the wheels rotation forward.

The purpose, therefore, of the present apparatus is to electrically interpret the two conditions in order to evaluate the tire pull or lateral scuffing effect, and simultaneously show the true wheel toe condition. The meters for the apparatus are mounted in a cabinet 57 (FIG. 1) and a hand held control switch block 58 is connected by line 59 so that a "read" switch 60 may be convenient to the operator.

In FIG. 5 there is shown the wiring diagram for reading wheel toe. The voltage signal from the left wheel potentiometer 50 (FIG. 3) is brought by line 56 to an input terminal 61 and from the right wheel potentiometer 42 the voltage input signal is brought by line 54 to input terminal 62. Buss lines 63 and 64 carry the right and left input signals respectively to electrical adder-memory unit 65 of FIG. 5, as well as to electrical subtractor-memory units 66 and 67 of FIG. 6 which will be described presently. A switch 68 in the hand held switch block 58 (FIG. 1) controls start and stop of motor 37 and the forward and reverse drive of the motor for rotating the wheel driving rollers 36 seen in FIG. 1 is controlled at switch 68A on the cabinet 57. With the vehicle steerable wheels RW and LW in position on the rollers 35 and 36, the switch 68 is closed for forward rotation.

Read switch 60 (FIG. 5) is now closed to energize relays K1 and K2 to move the sets of contact arms 70, 71, 72 and 73 to the dotted line positions so that the right wheel signal from buss 63 and lines 74 and the left wheel signal from buss 64 and line 76 charge capacitor 75 and 77. It is not believed necessary to designate every circuit connection as the same are self-evident upon inspection of FIGS. 5 and 6. The capacitors 75 and 77 are charged to the wheel toe signal which is the voltage differential of the signals on lines 63 and 64. The read switch 60 is released and the contact arms 70, 71 and 72 and 73 all move to the full line starting positions so that the capacitors 75 and 77 are connected in series additive and referenced to ground at line 78. The added voltage is fed through a buffer amplifier circuit 79 of known character to the meter 55 which indicates the toe condition of the wheels. A variable resistor 80A is provided in the circuit to perform the divide by two function to reduce the actual voltage value stored in capacitors 75 and 77 to a meter scale adjustment which is automatically the average of the two identical voltages in capacitors 75 and 77 and the meter 55 reads this average in terms of wheel toe. Therefore, the memory unit 65 is an "adder" unit, and the function of the unit 65 is completed insofar as a wheel toe reading is shown by the meter 55.

Upon actuation of switch 68A to reverse the wheel rotation of rollers 36, read switch 60 (FIG. 5) is again closed which energizes only relay K2. Contact arms 72 and 73 move to the dotted line position, which allows only capacitor 77 to charge to the new differential voltage between busses 63 and 64. When the read switch 60 is released the contact arms return to their starting positions so that capacitors 75 and 77 are again connected in series additive. The new signal voltage is processed as before and the reading at meter 55 is now the average of the forward and the reverse toe signal. This is the true toe angle reading.

During the time the adder memory unit 65 is being operated by the read switch 60 for forward and reverse wheel rotation, another function is being carried out in the left wheel subtractor-memory unit 67 and the right wheel subtractor-memory unit 66. These units are shown in FIG. 6. The right wheel signal carried by buss 63 is connected by line 83 to the unit 66 and the left wheel signal carried by buss 64 is connected by line 84 to the unit 67. Since these functions are identical except for the origin of the signal as will become apparent, only the left wheel system will be explained in detail.

As described earlier with switch 68 closed (wheels rotating in the forward direction), when the read switch is closed (FIG. 6) both relays K1 and K2 are energized. Contact arms 84, 85, 86, and 87 move to the dotted line position so that both capacitors 88 and 89 are charged to the individual toe signal appearing at buss 64 with respect to the ground potential at contact 78A in ground line 78. When the read switch is released the contact arms 84, 85, 86 and 87 all return to their initial full line position so that capacitors 88 and 89 are connected in series subtracting. Since the capacitors have been charged to the same voltage the resulting voltage across the series capacitors is zero. This voltage is fed through a buffer amplifier 90 to the meter 91 where variable resistor 92 provides the zero adjustment. Variable resistor 93 is provided in the meter circuit as a range adjustment to match the meter reading with the physical input.

With the reversing switch 68A closed which is the same condition described in FIG. 5 (the wheels rotating in the reverse direction) and the read switch 60 closed, only relay K2 is energized and only contact arms 86 and 87 are moved to the dotted line position. This allows only capacitor 89 to charge to the new voltage signal on buss 64. When the read switch 60 is released contact arm 86 and 87 return to their initial full line position reconnecting capacitors 88 and 89 in series subtracting. The resulting voltage across the series capacitors is now the difference between the forward individual toe and the reverse individual toe. The signal is processed as before and the reading at meter 91 is the value of the tire pull in feet per mile for the left wheel.

The foregoing description of the left wheel subtractor-memory unit of FIG. 6 applies equally well to the subtractor-memory unit 66 for the right wheel. The signal from buss 63 and line 83 is fed to unit 66. With the switch 68 closed for forward wheel rotation closing of read switch 60 energizes both relays K1 and K2. Contacts arms 94, 95 96 and 97 move to the dotted line position so that both capacitors 98 and 99 are charged to the individual toe signal from buss 63 with respect to the ground potential at contact 100 in ground line 78. Release of the read switch 60 allows the contact arms 94, 95, 96 and 97 to return to the full line positions so that capacitors 98 and 99 are connected in series subtracting. The charging voltage being the same, the voltage across the series capacitors is zero. This voltage is fed through a buffer amplifier 101 to a meter 102 where variable resistor 103 provides the zero adjustment. A variable resistor 104 is provided in the meter circuit as a range adjustment to match the meter reading with the physical input.

Now, with the switch 68A closed for reverse wheel rotation, and the read switch 60 again closed, only relay K2 is energized and only contact arms 96 and 97 are moved to the dotted line position. This allows only capacitor 99 to charge to the new voltage signal on buss 63. When the read switch 60 is released contact arms 96 and 97 return to the full line positions reconnecting capacitors 99 and 98 in series subtracting. The resulting voltage across these capacitors is now the difference between the forward individual toe and the reverse individual toe. The signal is processed as before and the reading at meter 102 is the value of the tire pull in feet per mile for the right wheel.

It is understood when viewing FIGS. 5 and 6 that the voltage supply line 52, relays K1 and K2, read switch 60 and motor control switch 68 identified in these views are identical and have been reproduced in each view for simplicity of disclosure. It is also understood that the buffer amplifiers 79, 90 and 101 are similarly constructed and of known character so that it is not believed necessary to describe in detail the components which are illustrated by well-known symbols.

The operation of each wheel rotating assembly 11 and 12 which has been set forth above may be better understood by the following explanation of the left wheel assembly 11 which is depicted diagrammatically in FIG. 7. The assembly 12 will have a similar function and need not be described in detail. It is observed that the tire of the left wheel LW engages roller 35 at a contact patch C1 and engages roller 36 at a second contact path C2. These contact patches exert forces on the respective rollers in directions parallel to the axes of rotation of the rollers. These axial forces are sensed by means described in the said Merrill U.S. Pat. No. 3,187,440 and the carrier cradle 18 is caused to swing in a horizontal plane about the center pin 17. For example, the forward rotation of the wheel LW may cause the cradle 18 to swing to the counterclockwise position 18A so that the rollers assume a position perpendicular to the reference axis 105 which is at an angle of deviation X from the plane PL of the wheel LW. The plane PL normally assumes an angular position of toe relative to the centerline CL of the vehicle. While the angular positions are small they have been purposely exaggerated for this description. The structural characteristics of the tire and its tread are responsible for this reaction of the rollers 35 and 36 on the carrier cradle 18. Now, when the roller 36 is driven to reverse the rotation of wheel LW the effect is to reverse the action of the contact patches C1 and C2 on the respective rollers and the cradle 18 swings to a new position 18B in which the rollers are perpendicular to the reference axis 106. The axis 106 may swing clockwise from the reference axis 105 and establish an angle Y. These two angular positions 105 and 106 are electrically measured by the circuits of FIGS. 5 and 6. The true toe angle Z is computed and seen at meter 55 in FIG. 5 while the tire pull represented by the angle X is computed and seen at the meter 91 of FIG. 6 for the left wheel LW and at meter 102 for the right wheel RW.

If it is assumed that the tire for the left wheel LW is perfect in construction it will be cradled evenly on rollers 35 and 36 and the carrier cradle 18 would swing clockwise from the longitudinal axis CL to bring the axes of these rollers into perpendicularity with the plane PL of the wheel LW and a true toe reading would be determined. But, because of the variations in tire construction, it has been found that the tire usually does not cradle evenly and the effect of this has been exemplified by the diagram of FIG. 7. Thus, it is necessary to electrically sense the action of the tire for both forward and reverse rotation to arrive at the difference in the two conditions because tire pull is rotation sensitive or is activated during rotation.

It will now be evident from the detailed description of the preferred apparatus in what manner the same operates to determine true wheel toe measurements as well as tire pull effects due to variations in tire construction. The apparatus satisfied the objects above enumerated, as well as other general objects which are to locate tires that will cause steering difficulties apart from wheel suspension mechanisms that may have loose or worn joints, or other mechanical defects.

We claim:

1. In testing apparatus for dynamically determining tire pull characteristics of a vehicle wheel, the combination which includes: a pair of rollers having a normal position in alignment opposite each other to support the tire thereon; a frame supporting said pair of rollers for rotation about parallel axes and for generally linear movement relative to said frame and to each other in a direction out of said normal alignment position along the axes of rotation of said rollers; means operably connected to one of said rollers to drive the same in forward and reverse directions and simulate vehicle road speeds, the drive on one roller effecting rotation of the other one of said pair through the tire supported on both said rollers; means supporting said frame for displacement in a generally horizontal plane to either side of an initial tire receiving position, said roller shift axially relative to each other causing said frame to be displaced toward a position in which said roller shift is reduced and returned toward said normal alignment position and said frame is established in a displaced position indicative of tire pull characteristics; means operably connected to said frame and frame supporting means to sense the direction and amount of displacement of said frame in the horizontal plane for forward and reverse tire rotation; and means operatively connected to said sensing means to make a visual display of the resulting frame displacement from forward to reverse tire rotation.

2. The testing apparatus of claim 1 wherein said sensor means includes a potentiometer carried by said roller support frame, and means operably connected to said frame support means and to said potentiometer to effect adjustment of said potentiometer to generate a signal proportional to said roller support frame position.

3. The testing apparatus of claim 1 wherein said sensing means is adapted to produce an electrical signal proportional to the angular position of the vehicle wheel; and said last-mentioned means connected to said sensing means includes adder-memory circuit means, a pair of signal storing means for forward drive of said roller means, switching means connected to said signal storing means, and control means operable to exclude one of said signal storing means upon reverse drive of said roller means to add said forward and reverse signal algebraically for said visual display means of tire pull information.

4. In vehicle wheel testing apparatus to determine tire pull characteristics, a pair of wheel cradling roller means, motor means driving said roller means in forward and reverse direction, frame means supporting said roller means and being free to move in a plane generally perpendicular to the plane of the wheel being tested, said pair of roller means having a normal position and being capable of being shifted in said frame means along the axis of rotation relative to each other, said roller shift causing said frame means to move in a direction to restore the roller means to the normal position, means operably mounted in said frame means to generate an electrical signal proportional to the moved positions of said frame means in response to forward and reverse rotation, and signal analyzing means connected to said signal generating means.

5. The vehicle wheel testing apparatus of claim 4 wherein said signal analyzing means includes a pair of signal storing means for forward drive of said roller means, and control means operable to exclude one of said signal storing means upon reverse drive of said roller means to subtract said forward and reverse signals of said pair of storing means algebraically.

6. In vehicle wheel testing apparatus to determine tire pull characteristics, roller means to cradle the vehicle wheels, carrier means supporting said roller means for movement in a horizontal plane and for allowing roller shift along the axis of rotation for relative motion between said rollers, motor means to rotate said roller means in forward and reverse directions selectively, electrical signal generating means in said apparatus responsive to the position of said carrier means for forward and for reverse wheel rotation, signal analyzing means connected to said signal generating means to electrically compare forward rotation signals with reverse rotation signals, means connected to said analyzing means to display the difference between the forward rotation signals and the reverse rotation signals, and control switch means connected to said signal analyzing means to sequentially activate said signal analyzing means for forward rotation and for reverse rotation.

7. In the testing apparatus of claim 6, said signal analyzing means includes capacitor elements and gang switching relays connecting said capacitors in series additive and series subtractive senses, and switch means to activate said relays, said switch means being connected into said display means to activate said display means for forward and reverse rotation conditions.